Feb. 24, 1948.     F. DOWD ET AL     2,436,423
MATERIAL WORKING APPARATUS
Filed June 28, 1944      2 Sheets-Sheet 1
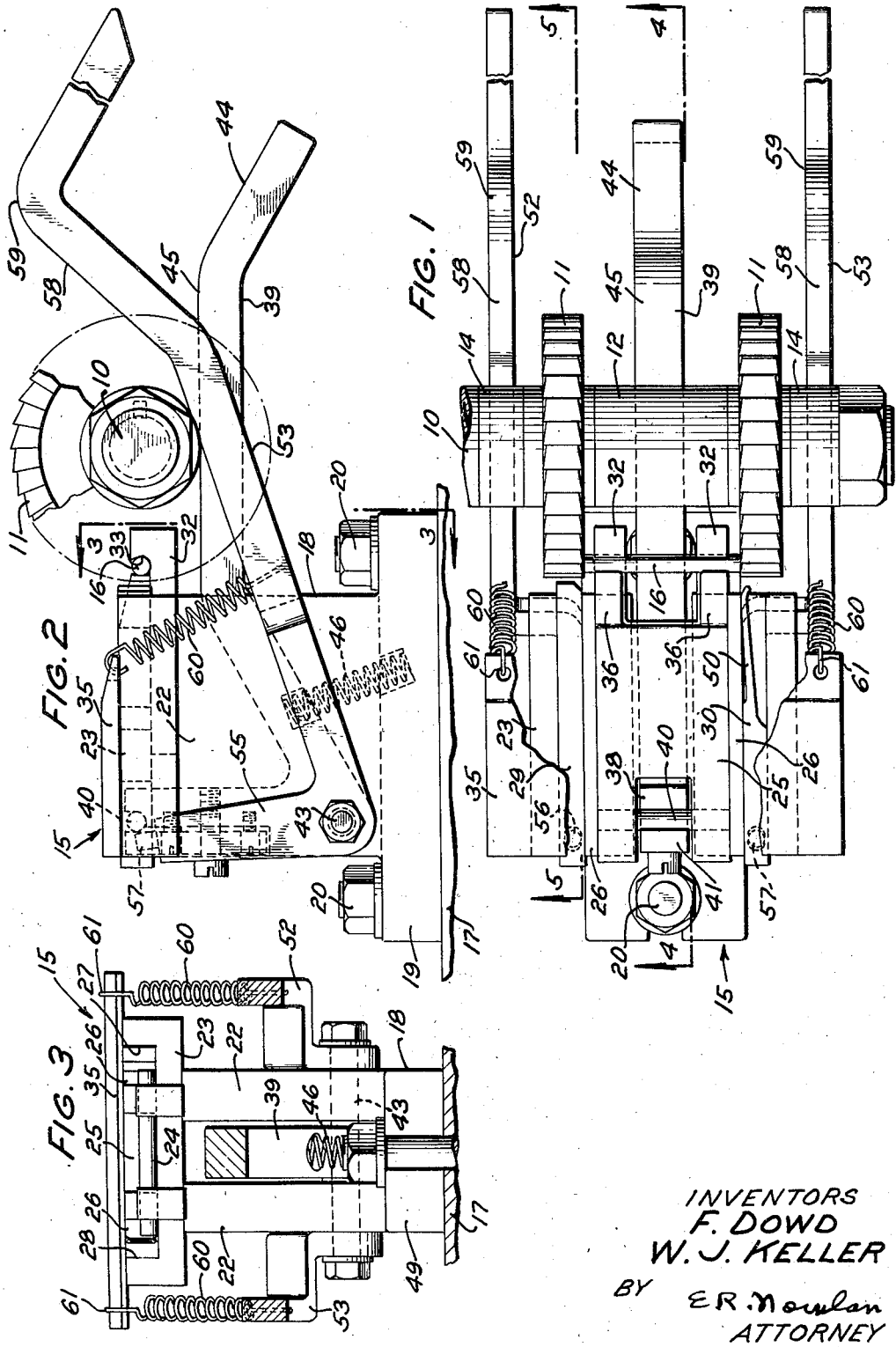
INVENTORS
F. DOWD
W. J. KELLER
BY E. R. Nowlan
ATTORNEY

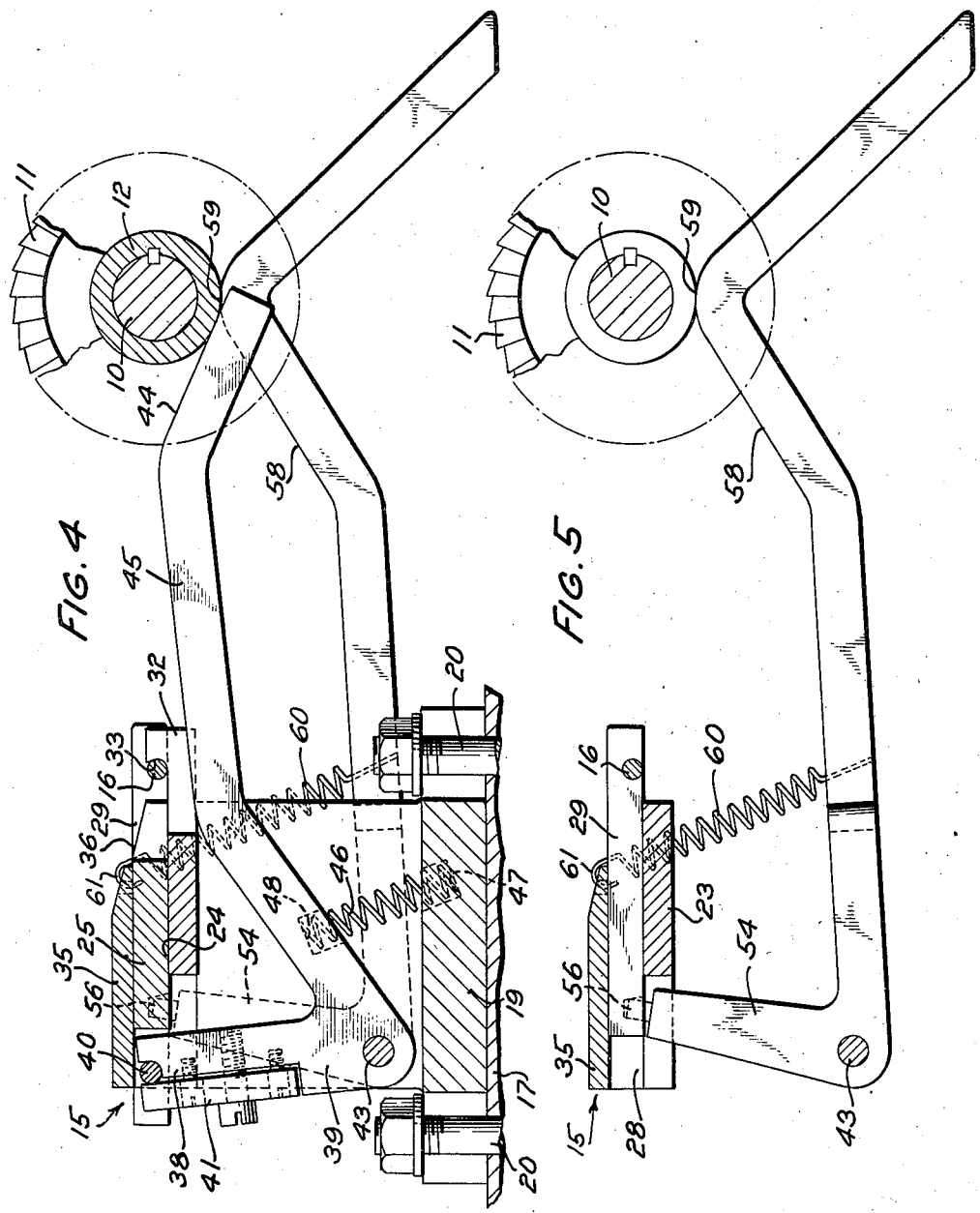

Patented Feb. 24, 1948

2,436,423

UNITED STATES PATENT OFFICE 2,436,423

MATERIAL WORKING APPARATUS

Frank Dowd, Belleville, and William J. Keller, Jersey City, N. J., assignors to Western Electric Company, Incorporated, New York, N. Y., a corporation of New York Application June 28, 1944, Serial No. 542,454

11 Claims. (Cl. 90—18)

This invention relates to material working apparatus, and more particularly to apparatus for milling ends of solenoid cores.

An object of the invention is to provide an apparatus which is simple in structure and highly efficient in operation for working materials.

With this and other objects in view, the invention comprises a rotatable material working element, a unit for supporting material, and means controlled by the relative movement of the unit and element to locate material and grip the same for accurate positioning of the material relative to the element.

Other objects and advantages will be apparent from the following detailed description when considered in conjunction with the accompanying drawings, wherein Fig. 1 is a fragmentary top plan view of the apparatus, portions thereof being broken away;

Fig. 2 is a side elevational view of the apparatus, portions thereof being broken away;

Fig. 3 is a fragmentary sectional view taken along the line 3—3 of Fig. 2;

Fig. 4 is a longitudinal vertical sectional view taken along the line 4—4 of Fig. 1, and Fig. 5 is a longitudinal vertical sectional view taken along the line 5—5 of Fig. 1.

Referring now to the drawings, attention is first directed to the fact that only those features of the apparatus essential in the illustration of the invention are shown. The apparatus includes a spindle 10 which is driven counterclockwise by any suitable means (not shown) and is supported in suitable bearings which are not illustrated in the drawing. Cutting elements 11, which in the present embodiment are termed milling cutters, are fixedly mounted upon the spindle 10 for rotation therewith. A collar 12 is mounted upon the spindle 10 between the cutters 11 and collars 14 are disposed upon the spindle at the outside portions of the cutters as illustrated in Fig. 1. Preferably the collars 12 and 14 are sealed roller bearings formed of suitable substantially wear-resisting material such as hardened steel. If desired, the collars 12 and 14 as well as the cutter 11 may be integral with the spindle.

A material supporting unit, indicated generally at 15, is adapted to function in conjunction with the spindle, particularly the collars 12 and 14 thereon, for locating, gripping and feeding material 16 to the elements 11. If desired, the spindle with the cutting elements may be moved relative to the unit or they may be moved simultaneously relative to each other, but in the present instance the unit 15 is mounted upon a carriage 17, the latter being of a suitable structure for movement of the unit in a given path toward or away from the cutting elements 11. A main frame or body 18 includes a base portion 19, notched at its opposing outwardly projecting ends to receive bolts 20 for use in securing the frame to the carriage 17. Spaced uprights 22 are formed integral with the base 19 and have their upper surfaces terminating in a common plane, upon which a head member 23 is mounted. The head member 23 is centrally grooved or recessed as at 24 to receive, for sliding movement therein, a clamping or holding element 25. Partitions 26 separate the central groove or recess 24 from smaller parallel grooves 27 and 28 in which locating elements 29 and 30 are movably disposed. Fixed clamping members 32, formed integral with the head member 23 and disposed at spaced positions as illustrated in Fig. 1, are formed identical in structure including pockets 33 in which the material or article 16 may be disposed. The holding or clamping element 25 acts in conjunction with the clamping members 32 to clamp the material or article 16 and hold it during the material working or milling operation. A cover 35, mounted upon the head member 23 in any suitable manner (not shown) and extending beyond the sides thereof as illustrated in Fig. 3, completes the recesses for the clamping element 25 and the locating elements 29 and 30.

The forward portion of the clamping element 25 is bifurcated and has tapered surfaces 36 to function in directing the material 16 into the pockets 33 during the feeding of the material to the unit 15. The opposite end of the element 25 is also bifurcated to receive a notched end 38 of an actuating lever 39. A pin 40 carried by the element 25 provides the operative connection between it and the notched end 38 of the lever 39. In actual structure an adjustable plate 41 completes the structure of the end 38 of the lever 39, to provide adjustment for its connection with the pin 40.

The lever 39 is of the contour illustrated particularly in Fig. 4 and is disposed between the uprights 22 of the frame 18 and supported on a pivot shaft 43. The forward arm of the lever 39 includes a diagonal portion 44 extending forwardly from a straight portion 45. A spring 46, having one end disposed in a pocket 47 in the base portion 19 and the other end disposed in a pocket 48 of the lever 39, normally urges the lever counterclockwise into engagement with the collar 12.

The locating element 29 is of the contour illustrated particularly in Figs. 1 and 5 and may be termed a rigid element in that it serves to positively locate one end of an article or length of material relative to its respective cutting element 11. Due to the fact that the successive lengths of material 16 may vary, the locating element 29 serves to positively locate its respective end of the material, while the locating element 30 is formed to provide a resilient portion 50, this portion being variable with the variations in the length of the material but having an inherent force capable of holding the material against the locating element 29 when both elements are in their locating positions. Normally, that is, at all times except when the unit 15 is in its loading position, the locating elements 29 and 30 are in their rearmost or inoperative positions. Levers 52 and 53, which are substantially identical in structure, are mounted upon the same pivot, namely the shaft 43, with the lever 39, and have portions or arms 54 and 55 with reduced or pin-like projections 56 and 57 receivable in companion pockets in their respective locating elements 29 and 30. The forward ends of the levers have cam-like diagonal surfaces 58 with high portions 59 adapted to move in engagement with their respective collars 14 and held in engagement therewith by springs 60, the lower ends of which are connected to the levers, their upper ends 61 being connected to the cover 35.

Upon considering the operation of the apparatus, attention is first directed to Figs. 4 and 5, which illustrate the loading position. In this position the lever 39 has been moved counterclockwise to move the clamping element 25 into its open position so that the material or article 16 may be readily disposed in the pockets 33 of the fixed clamping members 32. Furthermore, at this position the locating elements 29 and 30 are in their locating positions so that the article or material 16 must be disposed therebetween when moved into the pockets 33. During the positioning of the material in the pockets the resilient portion 50 of the element 30 may be flexed depending upon the length of the material, the force of this resilient or flexible portion causing the opposite end of the material to lie in intimate engagement with the locating element 29. The apparatus is now in readiness for operation and during movement of the unit 15 toward the spindle 10 or the cutting elements 11 thereon, the levers 39, 52 and 53 are caused to function as they move relative to their collars 12 and 14. In other words, as the diagonal portion 44 of the lever 39 rides beneath the collar 12, the clamping element 25 will be moved into intimate engagement with the material 16 and will thus cooperate with the fixed clamping members 32 to firmly hold the material against displacement.

During this movement of the unit 15 the high portions 59 of the levers 52 and 53 move beyond their collars 14 and the diagonal surfaces 58 of the levers begin to ride upon their respective collars. The levers 52 and 53 are, therefore, caused to be moved counterclockwise by their springs 60 to cause the locating elements 29 and 30 to move rearwardly into the position shown in Figs. 1 and 2. The locating elements are of sufficient length, however, to maintain location of the material 16 in the pockets 33 until the clamping element 25 is brought into clamping engagement with the material. In Figs. 1 and 2 the end of the operating movement, or the completion of one-half of the operating cycle, is illustrated. The material 16 continues to be firmly held against displacement while being moved between the cutting elements or milling cutters 11, to cause milling of the ends of the material accurately and to successively form articles of given lengths.

After the first half of the operating cycle has been completed, the unit 15 is moved rearwardly from the position shown in Figs. 1 and 2 to the position shown in Fig. 4. During this travel of the unit the article remains clamped until the diagonal portion 44 is brought into engagement with the collar 12, allowing the spring 46 to move the lever 39 counterclockwise to move the clamping element 25 free of the finished article. Also, during the movement of the unit 15 to its loading position from that position shown in Fig. 2, the locating elements 29 and 30 remain in their rearmost positions until forced forwardly by the levers 52 and 53 during the travel of the diagonal surfaces 58 in engagement with the collars 14 until the high portions 59 of the lever are positioned beneath and in engagement with their respective collars. The locating elements are, therefore, automatically brought into place and after the finished article 16 has been removed another length of material or article may be disposed in the pockets 33 and the operating cycle repeated.

Although specific improvements of the invention have been shown and described, it will be understood that they are but illustrative and that various modifications may be made therein without departing from the scope and spirit of this invention as defined by the appended claims.

What is claimed is:

1. A material working apparatus comprising a rotatable material working element, a spindle therefor rotatable about a fixed axis, and a unit, for feeding material to the element, mounted for movement relative thereto through successive operating cycles, relatively movable clamping members in the unit, and a cam-like element movable with the unit relative to the spindle and actuated thereby to cause relative movement of the clamping members to cause clamping of the material during a given portion of each operating cycle.

2. A material working apparatus comprising a rotatable material working element, a spindle therefor rotatable about a fixed axis, and a unit, for feeding material to the element, mounted for movement relative thereto through successive operating cycles, a cam-like element movable with the unit relative to the spindle and actuated thereby to clamp the material against displacement during a given portion of each operating cycle, and a cam-like element in the unit actuated by the spindle when moved relative thereto to locate the material relative to the clamping means.

3. A material working apparatus comprising a rotatable material working element, a spindle therefor rotatable about a fixed axis, and a unit, for feeding material to the element, mounted for movement relative thereto through successive operating cycles, a fixed clamping member disposed in the unit, a companion clamping member disposed in the unit, and a cam lever pivotally mounted in the unit and actuable by the spindle when moved relative thereto with the unit to move the said companion clamping member relative to the fixed member to cause clamping of material thereby during a portion of each operating cycle.

4. A material working apparatus comprising a rotatable material working element, a spindle therefor rotatable about a fixed axis, and a unit, for feeding material to the element, mounted for movement relative thereto through successive operating cycles, a fixed clamping member disposed in the unit, a companion clamping member disposed in the unit, means under the control of the spindle to move the said companion clamping member relative to the fixed member to cause clamping of material thereby during a given portion of each operating cycle, a locating element movably disposed in the unit, means to hold the locating element adjacent to the clamping members to locate the material therein until after the clamping members are closed on the material, and a cam lever actuated when moved into engagement with the spindle during movement of the unit relative thereto to move the locating member away from the material before the latter is engaged by the material working element.

5. A material working apparatus comprising a rotatable material working element, a spindle therefor rotatable about a fixed axis, and a unit, for feeding material to the element, mounted for movement relative thereto through successive operating cycles, relatively movable clamping members in the unit, means under the control of the spindle to cause relative movement of the clamping members to cause clamping of the material during a given portion of each operating cycle, locating elements disposed at opposite sides of the clamping members in the unit, and means to move the locating elements relative to the clamping members and into engagement with the opposing ends of the material to jointly locate the material therein.

6. A material working apparatus comprising a rotatable material working element, a spindle therefor rotatable about a fixed axis, and a unit, for feeding material to the element, mounted for movement relative thereto through successive operating cycles, relatively movable clamping members in the unit, means under the control of the spindle to cause relative movement of the clamping members to cause clamping of the material during a given portion of each operating cycle, locating elements disposed at opposite sides of the clamping members in the unit, and means movable with the unit and actuated by the spindle to simultaneously move the locating elements relative to the clamping members and into engagement with the opposing ends of the material to jointly locate the material therein.

7. A material working apparatus comprising a rotatable material working element, a rotatable spindle therefor and a unit for feeding material thereto mounted for relative movement through successive operating cycles, relatively movable clamping members in the unit, means under the control of the spindle to cause relative movement of the clamping members to cause clamping of the material during a given portion of each operating cycle, a rigid locating element disposed at one side of the clamping members, a resilient locating element disposed at the other side of the clamping members, and means to move the locating elements relative to the clamping members to jointly locate the material therein.

8. A material working apparatus comprising spaced rotatable material working elements, a spindle therefor rotatable about a fixed axis, a carriage movable relative to the spindle to move a length of material between the material working elements, a fixed position clamping member on the carriage, a movable clamping member on the carriage, locating elements mounted for movement on the carriage at their respective sides of the clamping members, a cam lever pivotally supported by the carriage, operatively connected to the locating elements and formed to be moved about its pivot by the spindle when moved relative thereto to move the locating elements simultaneously into locating positions, and a cam lever pivotally supported by the carriage, operatively connected to the movable clamping member and formed to be moved about its pivot by the spindle when moved relative thereto to cause clamping of the material subsequent to the actuation of the locating elements and holding of the material thus clamped during movement of the material between the material working elements.

9. A material working apparatus comprising spaced rotatable material working elements, a spindle therefor rotatable about a fixed axis, a carriage movable relative to the spindle to move a length of material between the material working elements, spaced fixed position clamping members on the carriage, a movable clamping member on the carriage interposed between the fixed position clamping members, locating elements mounted for movement on the carriage at their respective sides of the clamping members, a cam lever pivotally supported by the carriage, operatively connected to the locating elements and formed to be moved about its pivot by the spindle when moved relative thereto to move the locating elements simultaneously into locating positions, and a cam lever pivotally supported by the carriage, operatively connected to the movable clamping member and formed to be moved about its pivot by the spindle when moved relative thereto to cause clamping of the material subsequent to the actuation of the locating elements and holding of the material thus clamped during movement of the material between the material working elements.

10. A material working apparatus comprising spaced rotatable material working elements, a spindle therefor rotatable about a fixed axis, a carriage movable relative to the spindle to move a length of material between the material working elements, a fixed position clamping member on the carriage, a movable clamping member on the carriage, a rigid locating element mounted for movement on the carriage at one side of the clamping members to engage and locate one end of the material, a resilient locating element mounted for movement on the carriage at the other side of the clamping members to engage the other end of the material and force the material into engagement with the rigid locating element, a cam lever pivotally supported by the carriage, operatively connected to the locating elements and formed to be moved about its pivot by the spindle when moved relative thereto to move the locating elements simultaneously into locating positions, and a cam lever pivotally supported by the carriage, operatively connected to the movable clamping member and formed to be moved about its pivot by the spindle when moved relative thereto to cause clamping of the material subsequent to the actuation of the locating elements and holding of the material thus clamped during movement of the material between the material working elements.

11. A material working apparatus comprising spaced rotatable material working elements, a spindle therefor rotatable about a fixed axis, a carriage movable relative to the spindle to move a length of material between the material working elements, a fixed position clamping member on the carriage, a movable clamping member on the carriage, means normally urging the movable clamping member away from the fixed position clamping member, locating elements mounted for movement on the carriage at their respective sides of the clamping members, means normally urging the locating elements out of locating positions, a cam lever pivotally supported by the carriage, operatively connected to the locating elements and formed to be moved about its pivot by the spindle when moved relative thereto to move the locating elements simultaneously into locating positions, and a cam lever pivotally supported by the carriage, operatively connected to the movable clamping member and formed to be moved about its pivot by the spindle when moved relative thereto to cause clamping of the material subsequent to the actuation of the locating elements and holding of the material thus clamped during movement of the material between the material working elements.

FRANK DOWD.
WILLIAM J. KELLER.

REFERENCES CITED

The following references are of record in the file of this patent:

UNITED STATES PATENTS

| Number | Name | Date |
| --- | --- | --- |
| 993,158 | Einfeldt | May 23, 1911 |
| 1,730,938 | Kleeb et al. | Oct. 8, 1929 |
| 2,298,955 | Mason et al. | Oct. 13, 1942 |
| 2,358,880 | Robinson | Sept. 26, 1944 |